H Wight,
Shoe Sole,
No. 1,023, Reissued Aug. 7, 1860.
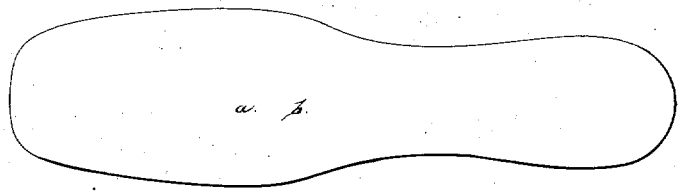
Fig. 3.
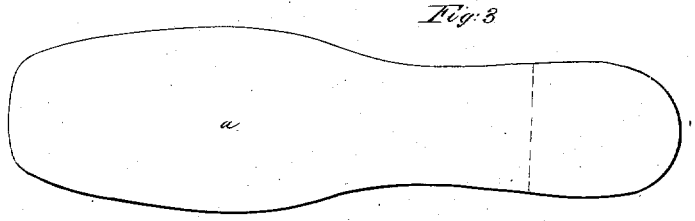
Fig. 6.
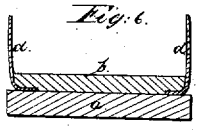
Fig. 2.
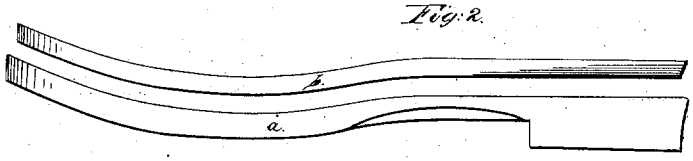
Fig. 5.
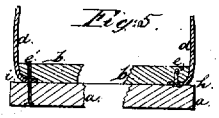
Fig. 4.
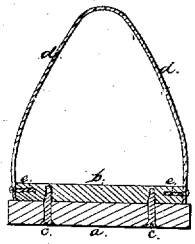
Fig. 1.
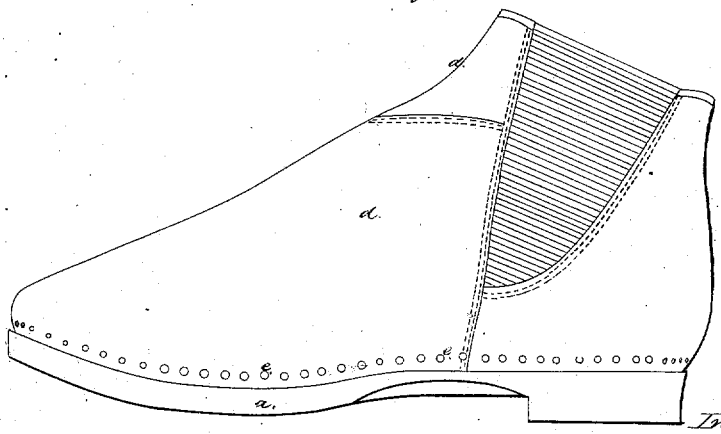
Inventor,
Henry Wright.
N. PETERS, PHOTO-LITHOGRAPHER, WASHINGTON, D. C.

UNITED STATES PATENT OFFICE.

HENRY WIGHT, OF CAMBRIDGE, ASSIGNOR TO WM. C. McCLALLAN, OF SPRINGFIELD, MASSACHUSETTS.

IMPROVEMENT IN WOODEN-SOLED SHOES.

Specification forming part of Letters Patent No. 27,414, dated March 6, 1860; Reissue No. 1,023, dated August 7, 1860.

*To all whom it may concern:*

Be it known that I, HENRY WIGHT, of Cambridge, county of Middlesex, and State of Massachusetts, have invented new and useful Improvements in the Manufacture of Boots and Shoes Having Wood Soles; and I do hereby declare that I believe the following to be a full and exact description thereof, reference being had to the accompanying drawing, and to the letters of reference marked thereon.

The nature of the first part of my improvement in the manufacture of boots and shoes having wood soles consists in the use of two soles instead of one only, which has been the method of constructing them heretofore, (the upper to which has been screwed thereto by means of a rabbet formed in the edge with nails,) between which the upper is secured by any well-known proper fastenings; and the nature of the second part of my improvement consists in making a groove or slit in the edge of the sole and securing the upper therein by any of the well-known proper fastenings in such cases as where the boot or shoe is formed with one sole.

By constructing the wooden sole in two parts, or having two soles, a great advantage is gained. The finest and most delicate leather as well as the heaviest in use may be lasted and formed into a shoe or boot of a neat and elegant style with the same convenience as it could be were leather soles used, and by rabbeting the upper part of the edge and cutting a groove in the edge of the sole (one sole) the upper leather may be lasted in the same way and the welt edge secured into the said groove, thus in this way also producing a neat and elegant style as if formed or made of leather.

To explain my invention fully and clearly, I will refer to my drawings, in which Figure 1 shows a gaiter boot or shoe as completed. Fig. 2 (*a b*) shows an edge view of the two soles before the upper part is put on or the two soles fastened together. Fig. 3 (*a b*) shows the form or shape of the two soles on the upper side. Fig. 4 is a cross-section of the boot completed in the line *f*, showing one of the methods in which the leather is fastened to the upper sole, and also the way the two soles are fastened together. Fig. 5 shows two ways for fastening the leather to the upper sole and fastening the two soles together. Fig. 6 shows how the leather and the soles are put together when they are fastened by cement, or any other of the well-known proper fastenings. Fig. 6 also shows a groove, *k*, cut in the edge of the sole, (*a* and *b* being one sole,) and the upper *d* secured therein by any of the well-known fastenings, as cement, nails, pegs, screws, &c.; and it will be clearly seen that the upper may be secured thoroughly in this way without exposing to view any of its fastenings.

*a* is the under sole. *b* is the upper sole, (or *a* and *b* are one sole;) *c*, the screws by which the two soles are fastened together. *d* is the upper leather; *e*, the nails which fasten the leather to the upper sole, or, as shown in Fig. 5, to both soles.

In constructing boots and shoes on my improved plan I propose to have the upper parts closed and prepared in a similar manner to what they should be if leather soles were to be put on. Then I put them onto the last and attach the leather to the inner sole by driving nails or pegs *e* through the leather and into the sole *b*, as shown at Figs. 1 and 4, or as shown at *h*, Fig. 5, and then I fasten the outer sole to the inner with screws or other proper suitable fastenings, as shown in Fig. 4, or with nails or pegs; or I fasten them with cement, or I have the leather bent round the edge, and a little way on the under side of the inner sole, and then the outer sole put on, and the same nails or pegs *e* which fasten the two soles together may also pass through the leather and secure it between the two soles, as shown at *i*, Fig. 5. Also, the leather may be fastened to the soles, as shown in Fig. 6, by having it bent round the edge of the inner sole and a little way under it, and fastened to it with cement or its equivalent, and then the outer sole fastened with cement or other substantial equivalents; also, when I use only one sole, as in Fig. 6, (*a b* being considered as one sole,) its edge being grooved and rabbeted, and the upper being secured therein by the use of proper fastenings.

It will be readily seen that in using wood as a material for boot and shoe soles they will be brought almost, if not entirely, on a par with leather in point of utility. The shoe can be lasted with equal facility; the leather can be secured to the sole with equal firmness. Without being subject to ground-wear, and in some of the ways of fastening the leather to the sole, the shoe can be made with equal neatness and good taste with those having leather soles. Besides, if this material can be substituted for leather to any considerable extent, it will supply a great want which has been felt for several years past. The demand for leather has grown faster than the supply.

What I claim is—

The new manufacture of boots and shoes as described—viz., a boot or shoe having a wooden sole made in two parts or pieces, (an inner sole, *b*, and an outer sole, *a*,) with the edge of the upper secured between them and the two soles fastened together by any suitable fastenings, substantially as described.

HENRY WIGHT.

Witnesses:

OLIVER WHITCOMB,
WM. K. JONES.